United States Patent
Chang et al.

(10) Patent No.: US 8,098,276 B2
(45) Date of Patent: Jan. 17, 2012

(54) STEREO VISION SYSTEM AND CONTROL METHOD THEREOF

(75) Inventors: Ji Ho Chang, Deajeon (KR); Seung Min Choi, Daejeon (KR); Jae Il Cho, Daejeon (KR); Dae Hwan Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 550 days.

(21) Appl. No.: 12/362,118

(22) Filed: Jan. 29, 2009

(65) Prior Publication Data

US 2010/0066811 A1    Mar. 18, 2010

(30) Foreign Application Priority Data

Aug. 11, 2008 (KR) .................. 10-2008-0078528

(51) Int. Cl.
*H04N 15/00* (2006.01)
*G06K 9/00* (2006.01)

(52) U.S. Cl. .................. 348/43; 382/154
(58) Field of Classification Search ............ 348/43; 382/154

See application file for complete search history.

(56) References Cited

U.S. PATENT DOCUMENTS

| | | | |
|---|---|---|---|
| 5,867,591 A * | 2/1999 | Onda | 382/154 |
| 7,313,265 B2 | 12/2007 | Nakai et al. | |
| 2002/0122587 A1 * | 9/2002 | Lim et al. | 382/165 |
| 2003/0038875 A1 * | 2/2003 | Ivanov et al. | 348/43 |
| 2004/0125106 A1 * | 7/2004 | Chen | 345/426 |
| 2005/0286757 A1 * | 12/2005 | Zitnick et al. | 382/154 |
| 2005/0286758 A1 * | 12/2005 | Zitnick et al. | 382/154 |
| 2007/0285554 A1 * | 12/2007 | Givon | 348/340 |
| 2008/0247670 A1 * | 10/2008 | Tam et al. | 382/298 |
| 2009/0273662 A1 * | 11/2009 | Lucente | 348/43 |
| 2010/0066811 A1 * | 3/2010 | Chang et al. | 348/43 |

* cited by examiner

*Primary Examiner* — Jerry Dennison
(74) *Attorney, Agent, or Firm* — Staas & Halsey LLP

(57) ABSTRACT

Provided are a stereo vision system and a control method thereof. A stereo vision system includes an image information extracting unit receiving left and right images of the left and right stereo cameras to extract color information for a brightness control of the images from the received images, an image preprocessing unit performing a process for reducing noises of the left and right images using the color information and a prestored calibration parameter, a stereo matching unit performing stereo matching of the left and right images processed by the image preprocessing unit through an algorithm to obtain a depth map, and a matching result measuring unit receiving the depth map obtained by the stereo matching unit to measure a matching degree, and changing the prestored calibration parameter according to a result of the measurement.

15 Claims, 11 Drawing Sheets

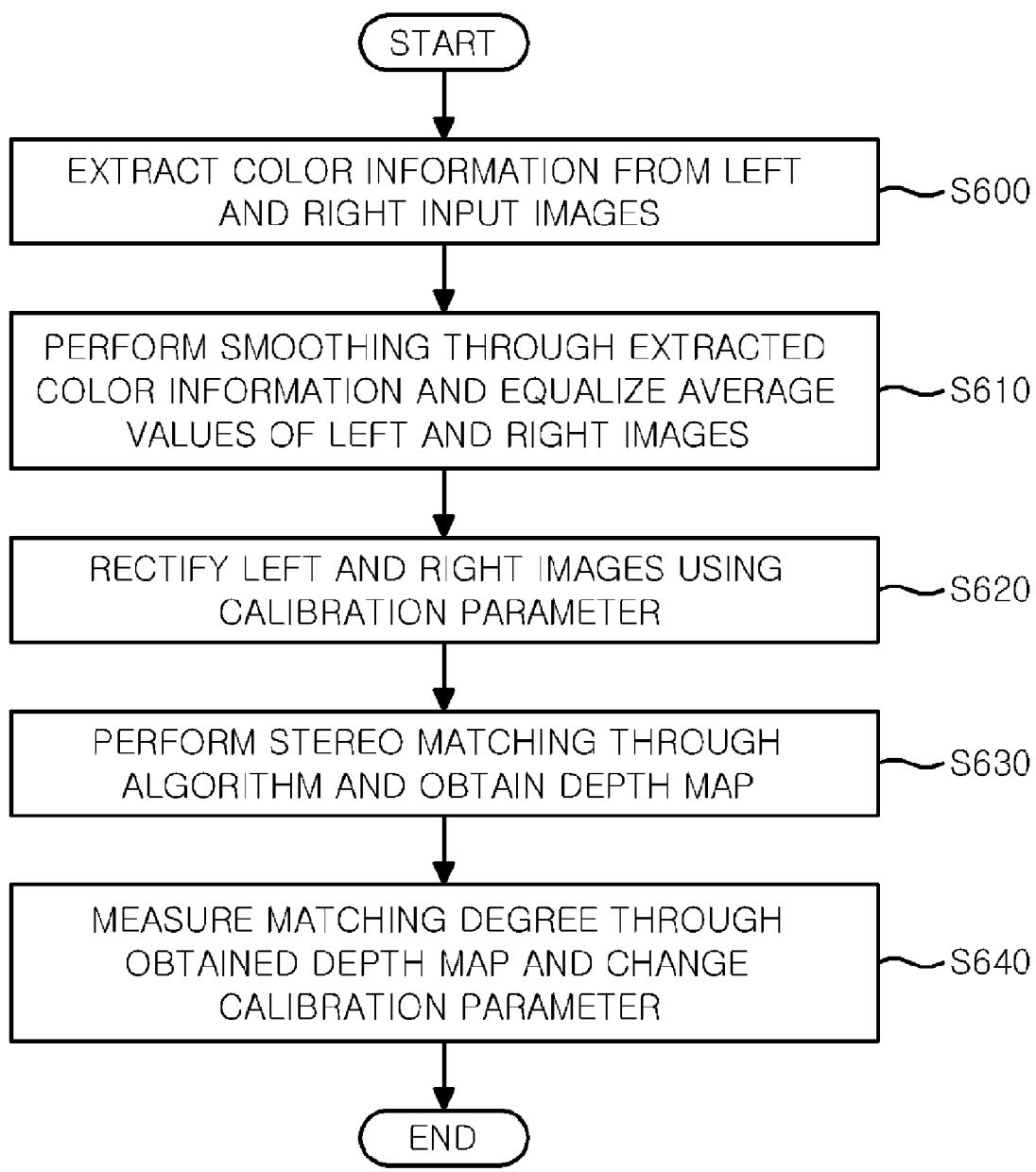

STEREO VISION SYSTEM AND CONTROL METHOD THEREOF

CROSS-REFERENCE TO RELATED APPLICATIONS

This application claims priority under 35 U.S.C. 119 to Korean Patent Application No. 10-2008-0078528, filed on Aug. 11, 2008, the disclosure of which is incorporated herein by reference in its entirety.

TECHNICAL FIELD

The present disclosure relates to a stereo vision system, and in particular, to a stereo vision system and a control method thereof, which is capable of enhancing the accuracy of stereo matching by controlling and rectifying brightness for left and right stereo images.

BACKGROUND

People can see things using binocular disparity in stereo-vision. The use of a stereo vision camera, which calculates distance information with two cameras according to such a principle, is a growing trend. The stereo vision camera is applied to cars (to guide a car when a car enters a garage, parks, or drives on a congested roadway or an express highway, or to easily drive a car on a surface street), mobile objects other than a car, robots, Factory Automation (FA), Laboratory Automation (LA), Office Automation (OA), Building Automation (BA), Home Automation (HA), precision measurement, etc. Generally, a stereo matching scheme is used to check distance information of an image using left and right stereo vision cameras.

That is, the stereo matching scheme is that a difference between two positions, i.e., disparity is extracted by detecting which position of other side image a pattern in a specific position of one side image is in using a binocular disparity characteristic that images are differently taken by two or more cameras are set up separated from each other by a certain distance, and thus a camera directly operates a distance value up to a real position of the pattern.

However, in the performance of the operation, the degrees of total images input from left and right cameras may differ according to the incident position of the characteristic light of each camera because of using the color information (a brightness value, etc) of left and right images, and calculation is performed for reducing an amount of calculation on the assumption that left lines respectively accord with right lines. Therefore, a good result cannot be obtained because there is a state where alignment is awry.

Accordingly, most of stereo vision systems solve the limitation by a hardware device capable of controlling the brightness value or alignment of left and right cameras or a software scheme. However, the hardware device has cases where a user directly controls the brightness value or alignment of the left and right cameras according to peripheral environments, and has the following limitations in a case where it is automated in a software manner. For example, in a software process, a board having a predetermined shape is photographed from various angles to be reflected. Referring to FIG. 1, each of the apexes and interconnection lines of a rectangle board having a chess-board shape is extracted and the alignment of left and right images is achieved using the extracted apexes and lines. In this case, although rectification is very accurately achieved, many images must be captured for the increment of accuracy, and apexes which are not automatically searched must directly be input by a user.

Moreover, since a stereo camera is not perfectly fixed, an alignment state again becomes awry due to a slight torsion, etc under use.

When the auto-exposure of the cameras is operated for use under the sensor difference of the each stereo camera or various lighting environments, the values of left and right cameras may become different. Because most of stereo vision systems calculate a depth map using a brightness value or a RGB value instead of a pattern of images, when the values of the left and right cameras are input different in brightness value, they exert a great influence on total images.

For example, in a case where a right image of FIG. 2B is more bright than a left image of FIG. 2A, if a stereo matching algorithm is performed on the right image of FIG. 2B and the left image of FIG. 2A, the image according to depth information can hardly be discriminated.

SUMMARY

Accordingly, the present disclosure provides a stereo vision system and a control method thereof which smooth a brightness value being color information of left and right images input from left and right stereo cameras, thereby obtaining images according to an accurate depth map through the rectification of left and right images.

The present disclosure also provides a stereo vision system and a control method thereof which can obtain a result of normal stereo matching through learning when a result of an abnormal stereo matching operation is obtained, thereby coping with a changing environment actively.

According to an aspect, there is provided a stereo vision system comprising left and right stereo cameras, the stereo vision system including: an image information extracting unit receiving left and right images of the left and right stereo cameras to extract color information for a brightness control of the images from the received images; an image preprocessing unit performing a process for reducing noises of the left and right images using the color information and a prestored calibration parameter; a stereo matching unit performing stereo matching of the left and right images processed by the image preprocessing unit through an algorithm to obtain a depth map; and a matching result measuring unit receiving the depth map obtained by the stereo matching unit to measure a matching degree, and changing the prestored calibration parameter according to a result of the measurement.

According to another aspect, there is provided A method for controlling a stereo vision system comprising left and right stereo cameras, the method including: extracting color information for a brightness control of an image when left and right images of the left and right stereo cameras are input; generating a histogram of the images through the extracted color information, smoothing the generated histogram, and simultaneously equalizing average values of the left and right images; performing image rectification which makes an epipolar line of the left image in accordance with an epipolar of the right image using a prestored calibration parameter after the generating and smoothing of the histogram; performing stereo matching of the left and right images processed in the generating and smoothing of the histogram and the performing of the image rectification through an algorithm to obtain a depth map; and receiving the obtained depth map to measure a matching degree, and changing the prestored calibration parameter according to a result of the measurement.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a flowchart illustrating an operation process of a stereo vision system according to an exemplary embodiment.

DETAILED DESCRIPTION OF EMBODIMENTS

Figure 1:
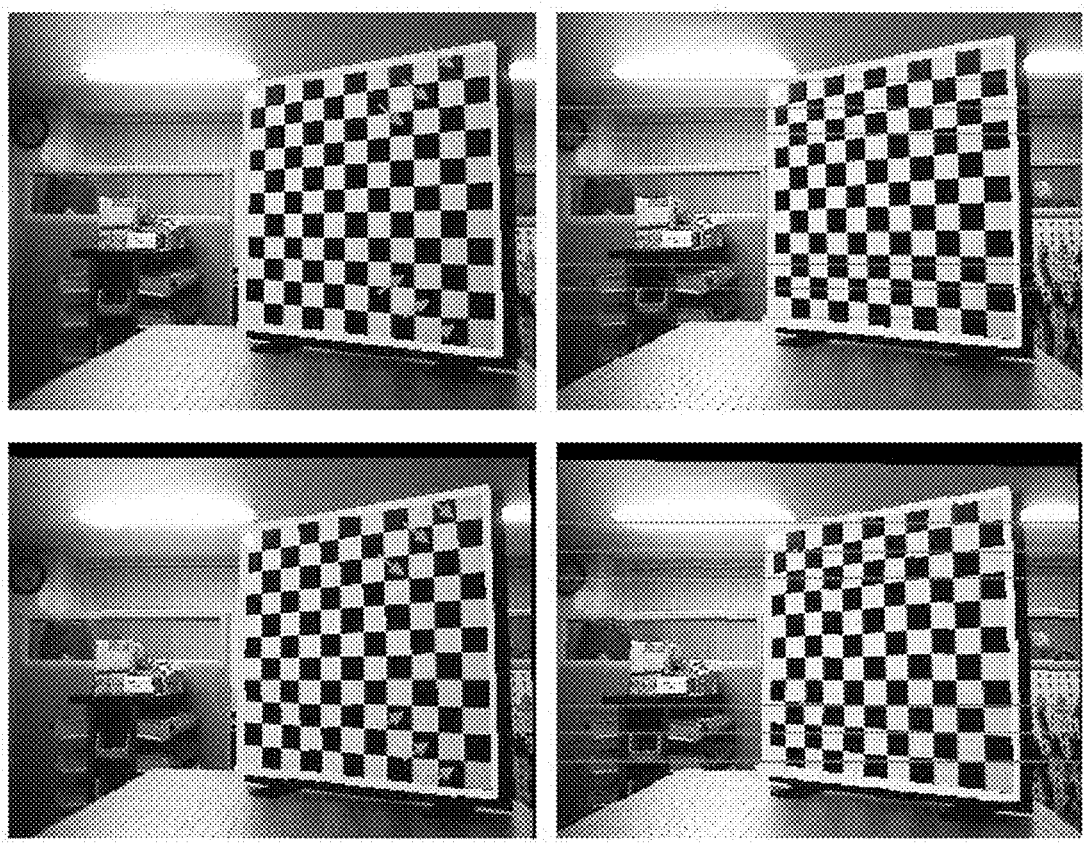
FIG. 1 illustrates an alignment state for left and right input images of the related art.
Figure 2A:
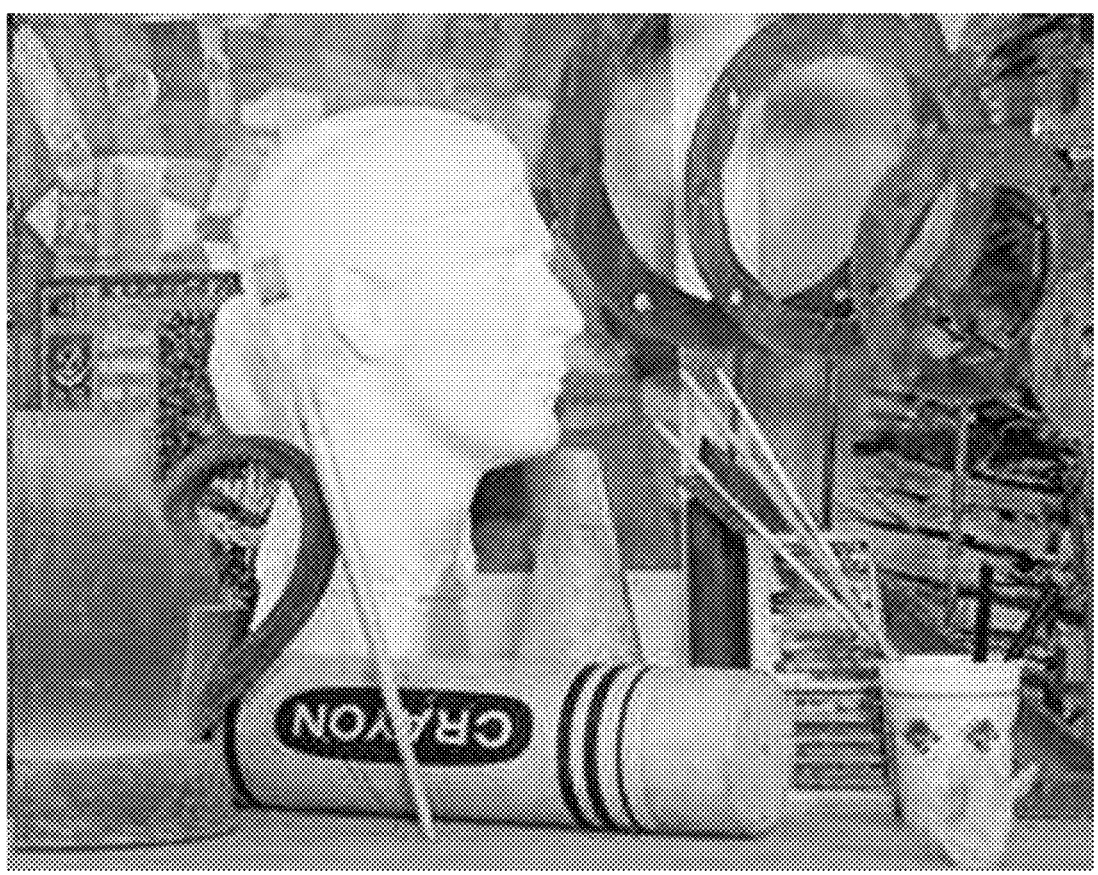
FIG. 2A illustrate a left input images of the related art.
Figure 2B:
FIG. 2B illustrate a right input images of the related art.

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Moreover, in description of an exemplary embodiment, the same element will be indicated as like reference numeral, and repeated description will be omitted.

Figure 3:
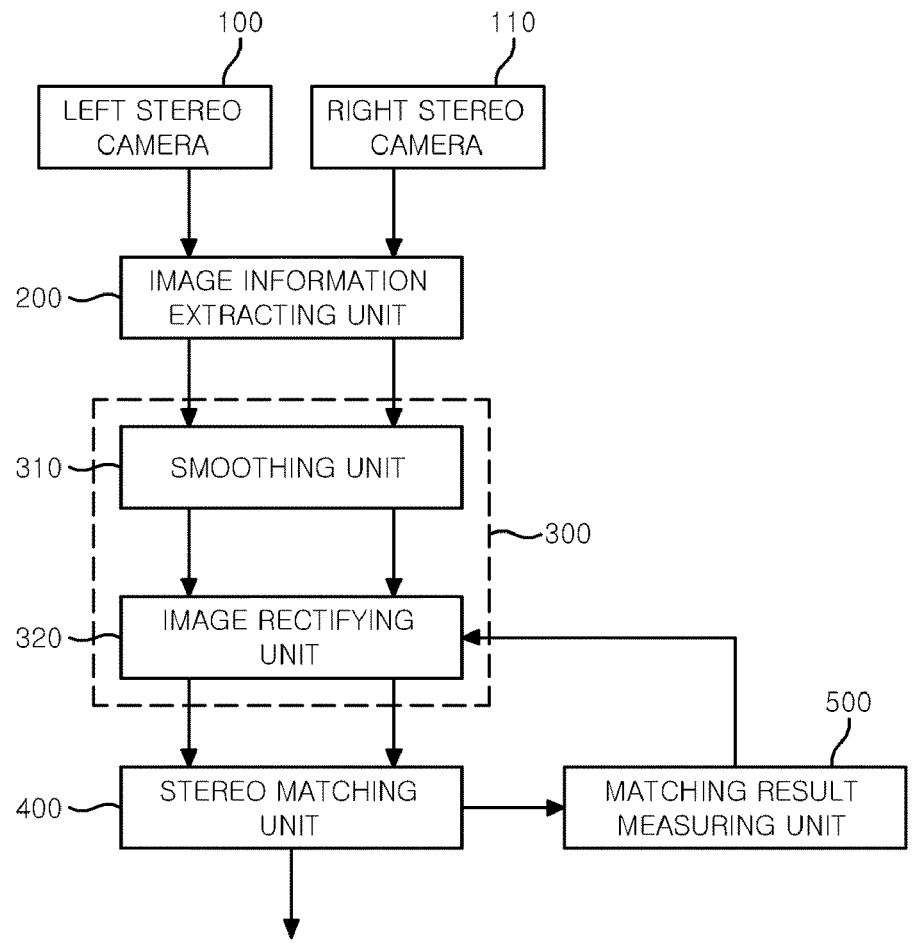
FIG. 3 is a block diagram of a stereo vision system according to an exemplary embodiment.
Figure 4:
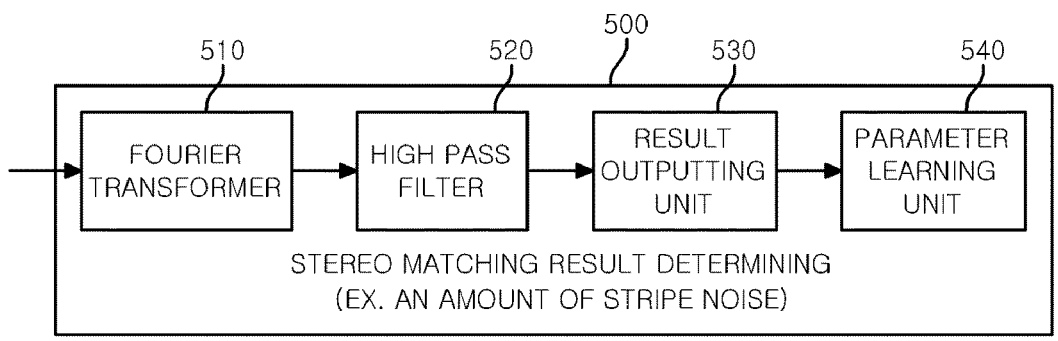
FIG. 4 is a block diagram of a matching result measuring unit of FIG. 3.

FIG. 3 is a block diagram of a stereo vision system according to an exemplary embodiment. FIG. 4 is a block diagram of a matching result measuring unit of FIG. 3.

Referring to FIG. 3, a stereo vision system according to an exemplary embodiment includes a left stereo camera 100, a right stereo camera 110, an image information extracting unit 200, an image preprocessing unit 300, a stereo matching unit 400, and a matching result measuring unit 500.

Figure 5A:
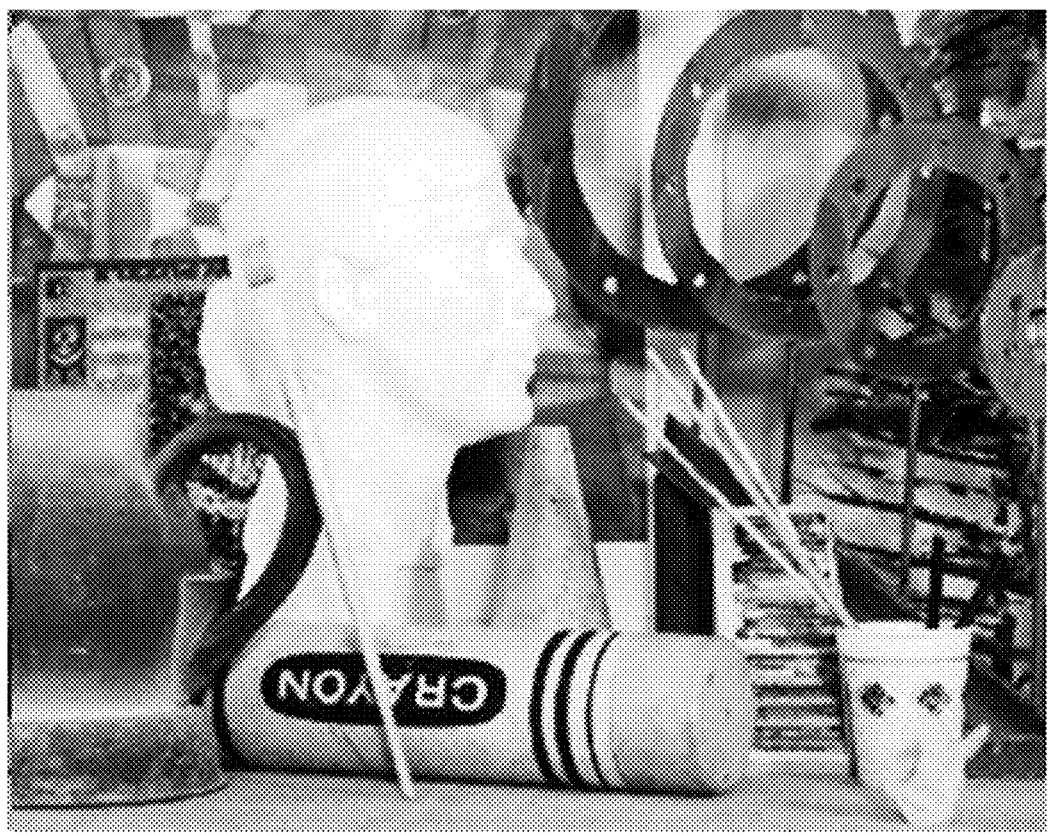
FIG. 5A illustrates images input from left stereo camera according to an exemplary embodiment.
Figure 5B:
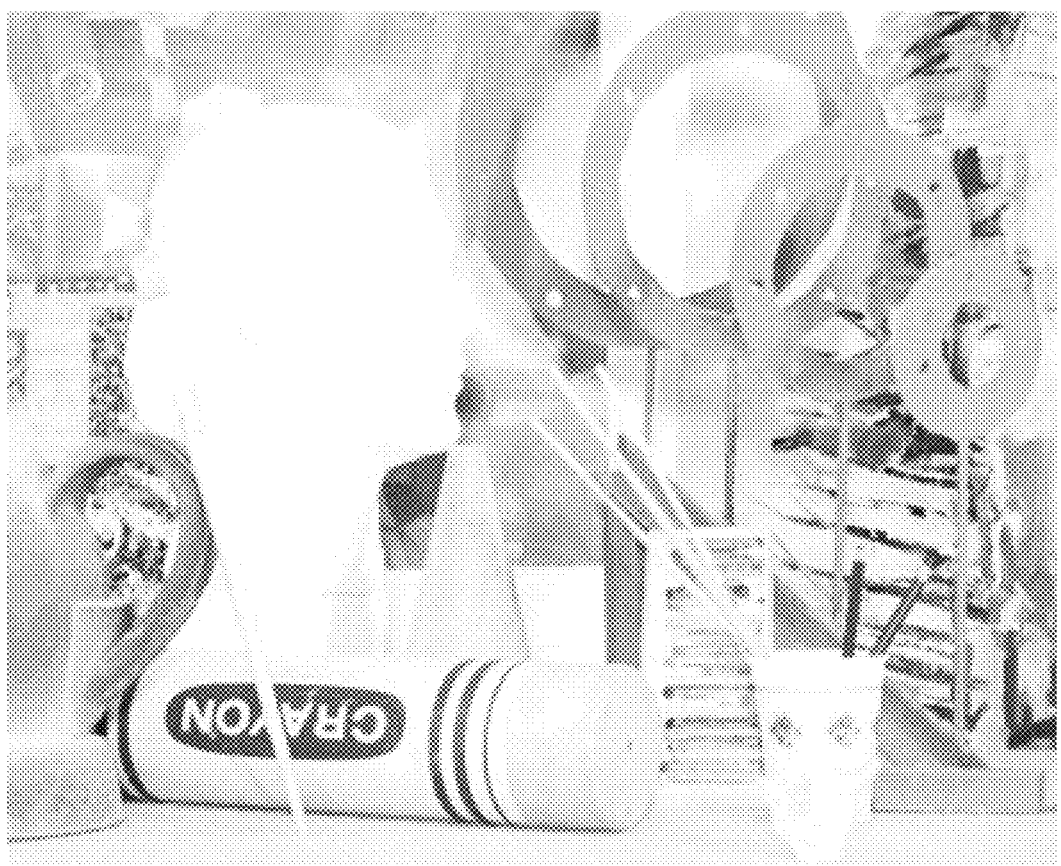
FIG. 5B illustrates images input from right stereo camera according to an exemplary embodiment.

When the left and right images, shown in FIG. 5A and FIG. 5B respectively, of the left and right stereo cameras 100 and 110 are input, the image information extracting unit 200 extracts color information for the brightness control of images.

Figure 5C:
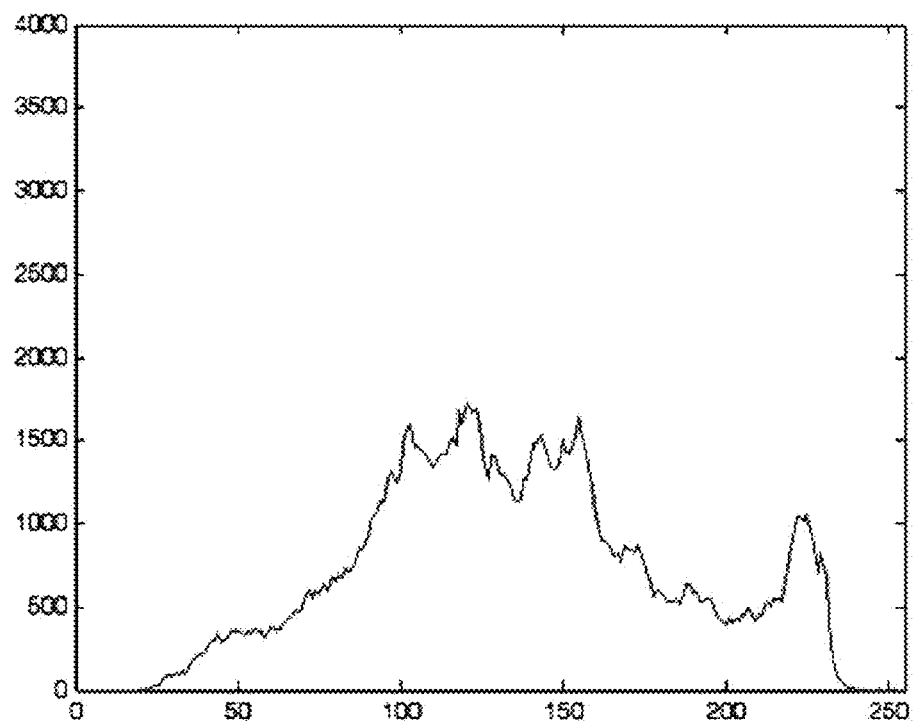
FIG. 5C illustrates a histogram of the left input images of FIG. 5A.
Figure 5D:
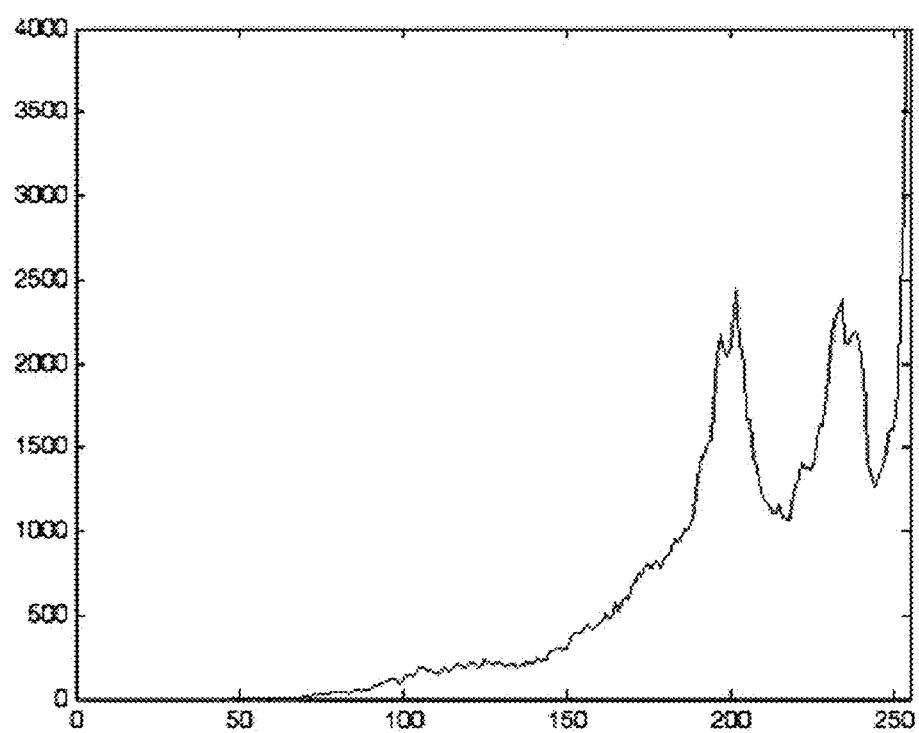
FIG. 5D illustrates a histogram of the right input images of FIG. 5B.
Figure 5E:
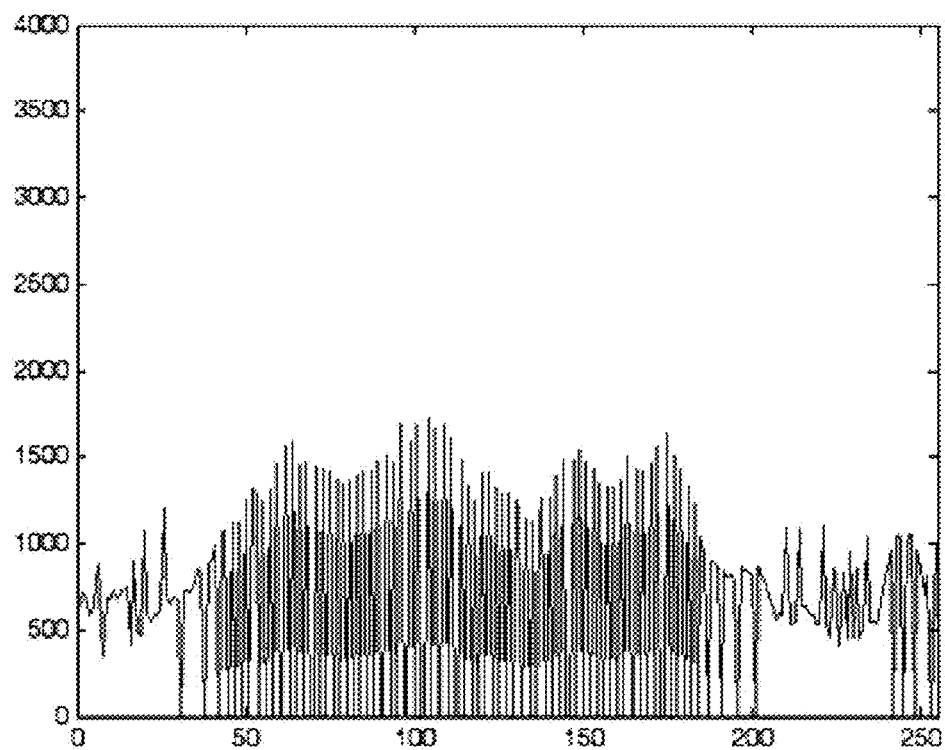
FIG. 5E illustrates a equalized result of a histogram of the left input images of FIG. 5C.
Figure 5F:
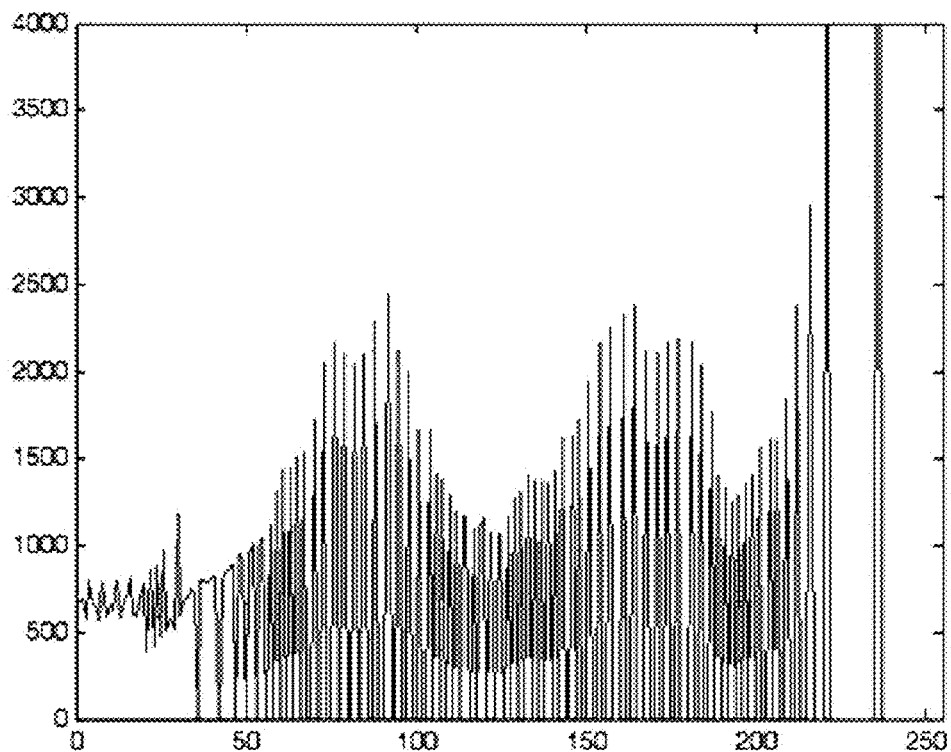
FIG. 5F illustrates a equalized result of a histogram of the right input images of FIG. 5D.
Figure 5G:
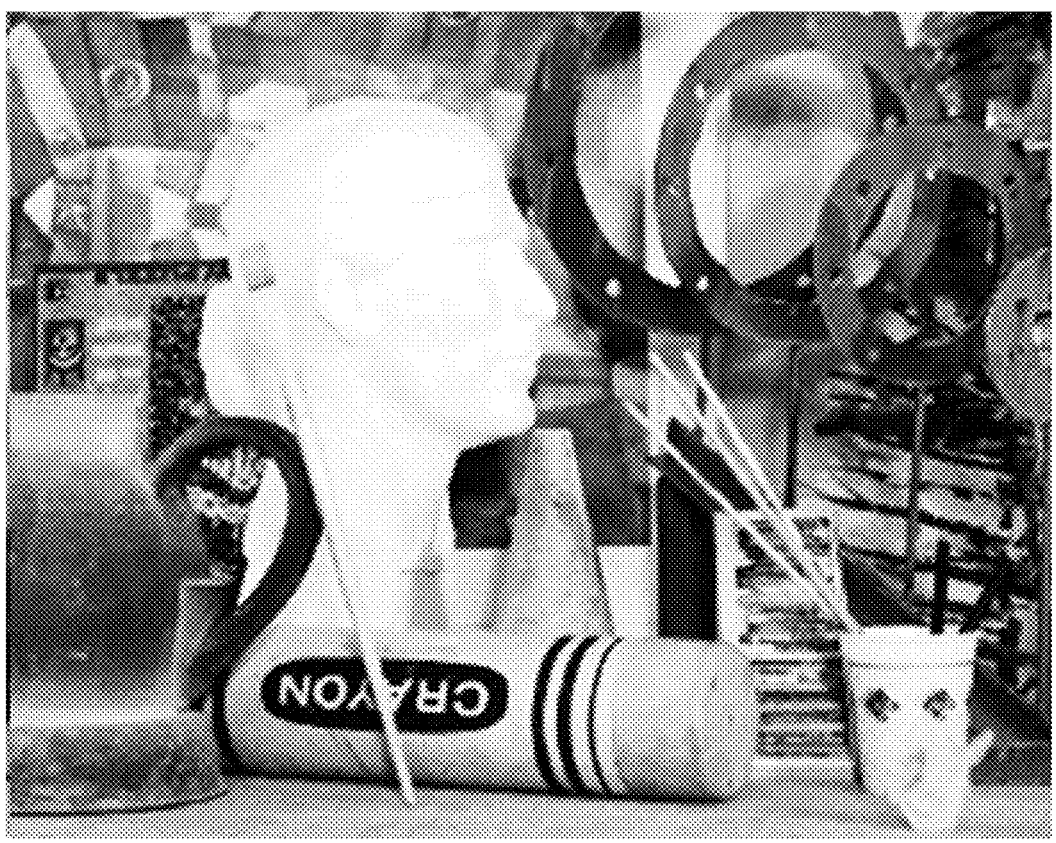
FIG. 5G illustrates a result image generated by the modification of input images based on a normalized sum of FIG. 5E.
Figure 5H:
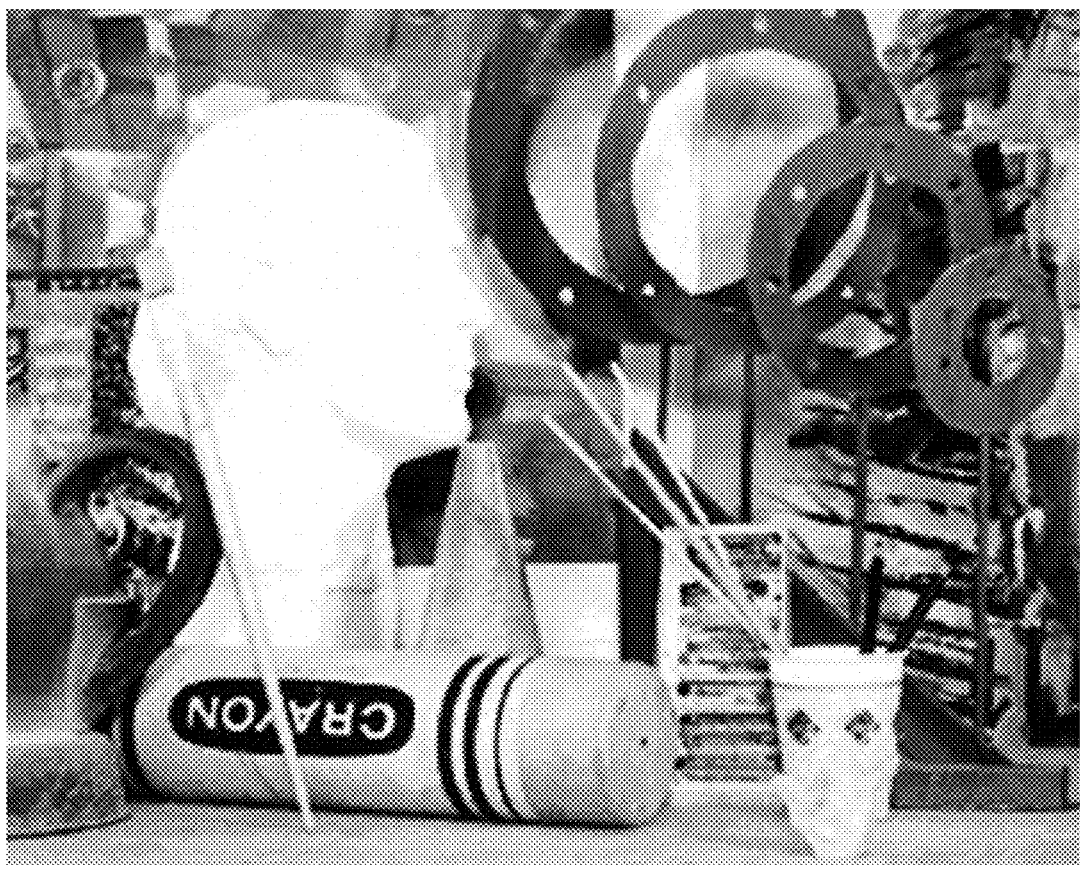
FIG. 5H illustrates a result image generated by the modification of input images based on a normalized sum of FIG. 5F.

The image preprocessing unit 300 performs a process for reducing the noises of the left and right images using the color information and a prestored calibration parameter, and includes a smoothing unit 310 and an image rectifying unit 320. The smoothing unit 310 generates histograms of left and right images as shown in FIG. 5C and FIG. 5D respectively through the extracted color information, equalizes the each generated histogram as shown in FIG. 5E and FIG. 5F, and generates equalized images as shown in FIG. 5G and FIG. 5H. The image rectifying unit 320 performs image rectification in which it makes the epipolar line of the left image in accordance with the epipolar of the right image using the prestored calibration parameter.

The smoothing unit 310 calculates the normalized sum (h(i)) of a histogram generated upon the smoothing of the histogram, and again modifies input images based on the calculated normalized sum (h(i)) to generate a result image.

That is, after the maximum brightness value (Gmax) of the color information (Gmax is 255 in a general white and black images) is divided by the total number of pixels (Nt, width+height) in the input images, the normalized sum (h(i)) is obtained from the multiplication of the divided value and the cumulative sum (H(i)) of an input image histogram (h(i)=(Gmax/Nt)*H(i)). For example, when a size is 4*4, brightness is 0 to 10 and a cumulative sum is 2 to 16, the total number of the pixels is 16 and a maximum brightness value is 0.625 so that the normalized sum is 1.25 to 10. Accordingly, although left and right images have significant difference in brightness as shown in FIG. 5A and FIG. 5B, the smoothing of the histogram reduce or eliminate the difference as shown in FIG. 5G and FIG. 5H. Consequently, one can acquire improved stereo matching result.

The image rectifying unit 320 aligns input images through the accordance of the epipolar lines, and performs image rectification using the prestored calibration parameter according to the disaccord degree of the alignment of the left and right images.

The stereo matching unit 400 performs the stereo matching of the left and right images processed by the smoothing unit 310 and image rectifying unit 320 of the image preprocessing unit 300 through an algorithm to thereby obtain a depth map.

The matching result measuring unit 500 receives the depth map obtained by the stereo matching unit 400, measures a matching degree, and changes the prestored calibration parameter according to a result of the measurement.

As illustrated in FIG. 4, the matching result measuring unit 500 includes a Fourier transformer 510, a high pass filter 520, a result outputting unit 530, and a parameter learning unit 540. The Fourier transformer 510 performs the Fourier transform of the depth map to change an entire image into a frequency domain, and the high pass filter 520 detects a high frequency signal from the changed frequency domain. Subsequently, the result outputting unit 530 outputs a coefficient value representing a matching degree using the high frequency signal and a prestored Look Up Table (LUT).

The parameter learning unit 540 learns the calibration parameters for the coefficient value to converge to a setting value, and changes the prestored calibration parameter into the learned calibration parameter.

The operation process of an exemplary embodiment having such a configuration will be described below with reference to the accompanying drawings.

FIG. 6 is a flowchart illustrating an operation process of a stereo vision system according to an exemplary embodiment.

Referring to FIG. 6, when the images of the left and right stereo cameras 110 and 110 are input, the color information for the brightness control of the images is extracted in step S600.

A histogram of the images is generated through the brightness value of the extracted color information, the generated histogram is smoothed, and the average values of the left and right images are equalized in step S610. In this step S610, the normalized sum of the generated histogram is calculated, and the input images are again modified based on the calculated normalized sum so that a result image is generated. Furthermore, after the maximum brightness value of the color information is divided by the total number of pixels in the input images, the normalized sum is obtained from the multiplication of the divided value and the cumulative sum of an input image histogram.

After the performance of the step S610, image rectification is performed in which the image rectifying unit 320 makes the epipolar line of the left image in accordance with the epipolar of the right image using the prestored calibration parameter is step S620. That is, the image rectification is performed using the prestored calibration parameter according to the disaccord degree of the alignment of the left and right images.

The depth map is obtained by performing the stereo matching of the left and right images processed in the steps S610 and S620 through algorithm in step S630.

The obtained depth map is input, a matching degree is measured, and the images are rectified by varying a calibration parameter according to a result of the measurement in step S640. Herein, the entire image is changed into the frequency domain through the Fourier transform of the depth map, the high frequency signal (i.e., a portion where at least one line occurs in an image) is detected from the changed frequency domain, and thereafter the coefficient value representing a matching degree is output using the prestored LUT.

In the step S640, the calibration parameters are further learned for the coefficient value to converge to a setting value, and the prestored calibration parameter is changed into the learned calibration parameter according to the learning.

At this point, in a case where the coefficient value exceeds the setting value, a learning process is performed. Upon the learning, the learning is repeated several times until the coefficient value being a variable value converges to under the setting value. Such a learning may be performed periodically or whenever necessary.

In this way, the stereo vision system and the control method thereof according to an exemplary embodiment obtain images in accordance with an accurate depth map through the smoothing, image rectification and learning of the left and right images.

As described in the background, the related art stereo vision system has limitations in that many images must be captured for the increment of accuracy and apexes which are not automatically searched must directly be input by a user when the alignment of the left and right images is controlled. Moreover, since a stereo camera is not perfectly fixed, the related art stereo vision system has limitation in that an alignment state again becomes awry due to a slight torsion, etc under use.

However, the stereo vision system and the control method thereof according to an exemplary embodiment smooth a brightness value being color information of left and right images input from left and right stereo cameras, thereby obtaining images according to an accurate depth map through the rectification of left and right images. Moreover, the stereo vision system and the control method thereof according to an exemplary embodiment can obtain a result of normal stereo matching through learning when a result of an abnormal stereo matching operation is obtained, thereby coping with a changing environment actively.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A stereo vision system comprising left and right stereo cameras, the stereo vision system comprising:
   an image information extracting unit receiving left and right images of the left and right stereo cameras to extract color information for a brightness control of the images from the received images;
   an image preprocessing unit performing a process for reducing noises of the left and right images using the color information and a prestored calibration parameter;
   a stereo matching unit performing stereo matching of the left and right images processed by the image preprocessing unit through an algorithm to obtain a depth map; and
   a matching result measuring unit receiving the depth map obtained by the stereo matching unit to measure a matching degree, and changing the prestored calibration parameter according to a result of the measurement.

2. The stereo vision system of claim 1, wherein the image preprocessing unit comprises:
   a smoothing unit generating a histogram of the images through the extracted color information, smoothing the generated histogram, and equalizing average values of the left and right images; and
   an image rectifying unit performing image rectification which makes an epipolar line of the left image in accordance with an epipolar of the right image using the prestored calibration parameter.

3. The stereo vision system of claim 2, wherein the smoothing unit calculates a normalized sum of the histogram generated upon the smoothing of the histogram, and again modifies the input images based on the calculated normalized sum to generate a result image.

4. The stereo vision system of claim 3, wherein a maximum brightness value of the color information is divided by the total number of pixels in the input images, and the normalized sum is obtained from a multiplication of the divided value and a cumulative sum of an input image histogram.

5. The stereo vision system of claim 1, wherein the matching result measuring unit comprises:
   a Fourier transformer performing a Fourier transform of the depth map to change an entire image into a frequency domain;
   a high pass filter detecting a high frequency signal from an output of the Fourier transformer, and outputting the detected signal; and
   a result outputting unit outputting a coefficient value representing a matching degree using the high frequency signal and a prestored look up table.

6. The stereo vision system of claim 5, wherein the matching result measuring unit further comprises a parameter learning unit learning the calibration parameters for the coefficient value to converge to a setting value.

7. The stereo vision system of claim 6, wherein the parameter learning unit repeatedly performs learning for the coefficient value being a variable value to converge to the setting value.

8. The stereo vision system of claim 5, wherein the matching result measuring unit performs a learning process when the coefficient value is more than the setting value.

9. A method for controlling a stereo vision system comprising left and right stereo cameras, the method comprising:

extracting color information for a brightness control of an image when left and right images of the left and right stereo cameras are input;

generating a histogram of the images through the extracted color information, smoothing the generated histogram, and equalizing average values of the left and right images;

performing image rectification which makes an epipolar line of the left image in accordance with an epipolar of the right image using a prestored calibration parameter after the generating and smoothing of the histogram;

performing stereo matching of the left and right images processed in the generating and smoothing of the histogram and the performing of the image rectification through an algorithm to obtain a depth map; and receiving the obtained depth map to measure a matching degree, and changing the prestored calibration parameter according to a result of the measurement.

10. The method of claim 9, wherein the generating and smoothing of the histogram comprises calculating a normalized sum of the histogram generated upon the smoothing of the histogram, and again modifying the input images based on the calculated normalized sum to generate a result image.

11. The method of claim 10, wherein a maximum brightness value of the color information is divided by the total number of pixels in the input images, and the normalized sum is obtained from a multiplication of the divided value and a cumulative sum of an input image histogram.

12. The method of claim 9, wherein the receiving of the depth map and the changing of the prestored calibration parameter comprises:

performing a Fourier transform of the depth map to change an entire image into a frequency domain;

detecting a high frequency signal from the frequency domain, and outputting the detected signal; and outputting a coefficient value representing a matching degree using the high frequency signal and a prestored look up table.

13. The method of claim 12, wherein the receiving of the depth map and the changing of the prestored calibration parameter further comprise learning calibration parameters for the coefficient value to converge to a setting value.

14. The method of claim 13, wherein the learning of the calibration parameters comprises repeatedly performing learning for the coefficient value being a variable value to converge to the setting value.

15. The method of claim 13, wherein in the receiving of the depth map and the changing of the prestored calibration parameter, a learning process is performed when the coefficient value is more than the setting value.

* * * * *